United States Patent [19]
Nagasaki et al.

[11] Patent Number: 6,073,826
[45] Date of Patent: Jun. 13, 2000

[54] MAGNETIC RECORDING AND REPRODUCING APPARATUS AND METHOD FOR ADJUSTING THE TILT OF A CAPSTAN SHAFT

[75] Inventors: Eiji Nagasaki, Katano; Koichiro Hirabayashi, Hirakata, both of Japan

[73] Assignee: Matsushita Electric Industrial Co., Ltd., Kadoma, Japan

[21] Appl. No.: 09/272,560

[22] Filed: Mar. 19, 1999

[30] Foreign Application Priority Data

Mar. 19, 1998 [JP] Japan .................................. 10-070172
Dec. 22, 1998 [JP] Japan .................................. 10-364521

[51] Int. Cl.[7] .................................................. B65H 20/00
[52] U.S. Cl. .......................................... 226/180; 226/194
[58] Field of Search ..................... 226/190, 194, 226/180; 242/340

[56] References Cited

U.S. PATENT DOCUMENTS

| | | | |
|---|---|---|---|
| 3,257,056 | 6/1966 | Cederberg et al. ................. | 226/190 X |
| 3,814,300 | 6/1974 | Fukayama .............................. | 226/194 |
| 3,949,919 | 4/1976 | Takei ...................................... | 226/194 |
| 4,756,461 | 7/1988 | Tanaka et al. ......................... | 226/194 |
| 5,934,538 | 8/1999 | Hirose et al. .......................... | 226/194 |

FOREIGN PATENT DOCUMENTS 705 514  12/1979  U.S.S.R. ................................ 226/194

*Primary Examiner*—Michael R. Mansen
*Attorney, Agent, or Firm*—Wenderoth, Lind & Ponack, L.L.P.

[57] ABSTRACT

A magnetic recording and reproducing apparatus enabling to optimal adjustment of the tilt of a capstan shaft against a chassis by means of a simple structure so as to realize stable tape transport. A housing (9) is fixed onto a chassis (6) by tightening a first fastening screw (14) and a second fastening screw (15). Then, the degree of rotation of an adjusting screw (16) is varied in order to accurately optimize the tilt of a capstan shaft (8).

21 Claims, 9 Drawing Sheets

MAGNETIC RECORDING AND REPRODUCING APPARATUS AND METHOD FOR ADJUSTING THE TILT OF A CAPSTAN SHAFT

BACKGROUND OF THE INVENTION

1. Field of the Invention

The present invention relates to magnetic recording and reproducing apparatuses for recording to and playing back from magnetic tapes, and methods for adjusting the tilt of capstan shafts.

2. Description of Related Art

Magnetic recording and reproducing apparatuses such as videocassette tape recorders are becoming much smaller and lighter.

A conventional magnetic recording and reproducing apparatus is described next.

FIG. 9 shows a side view of a capstan housing unit in a conventional magnetic recording and reproducing apparatus. A capstan shaft 8 drives a magnetic tape (not illustrated) by pressure contacting the magnetic tape with a pinch roller (not illustrated). A housing 9 has bearings 101 and 102 for the capstan shaft 8, and journals the capstan shaft 8. The housing 9 also has a first hole 22, second hole 23, and third hole 24. The third hole 24 has the same structure as the second hole 23, and thus they are illustrated in the same part of FIG. 9.

A first fastening screw 25 passes through the first hole 22, and screws into a first internal thread 28 in a chassis 6. A second fastening screw 26 passes through the second hole 23, and screws into a second internal thread 29 in the chassis 6. A third fastening screw 27 passes through the third hole 24, and screws into a third internal thread 30 in the chassis 6. Since the third hole 24, the third fastening screw 27 and the third internal thread 30 have the same structure as the second hole 23, the second fastening screw 26 and second internal thread 29, respectively, they are illustrated in the same part of FIG. 9.

As described above, the housing 9 is conventionally fixed onto the chassis 6 by employing the three fastening screws 25, 26, and 27.

However, with the above conventional configuration, it is difficult to mount the capstan shaft 8 onto the chassis 6 at a highly accurately controlled angle. More specifically, a deviation of approximately 10 minutes occurs with respect to the angle of the capstan shaft 8 by securing the housing 9 onto the chassis 8 by means of screws only. This deviation may cause unstable tape transport. Furthermore, due to the recent trend towards smaller mechanisms, higher mounting density of mechanical components and thinner tape, deviation in the tilt of the capstan shaft has a proportionally larger detrimental effect on stable tape transport.

SUMMARY OF THE INVENTION

An object of the present invention is to secure a capstan shaft against a chassis at a highly accurate position by means of a simple structure for stabilizing tape transport, thus providing an inexpensive but highly reliable magnetic recording and reproducing apparatus.

A magnetic recording and reproducing apparatus of the present invention comprises a capstan shaft for driving a magnetic tape by pressure-contact of the magnetic tape with a pinch roller. A housing having a bearing for the capstan shaft, is fixed onto a chassis. First and second through holes are provided in the chassis. An internally threaded opening is provided on the chassis for tilt adjustment. A first chassis bearing surface is provided near to the first hole on the chassis, and a second chassis bearing surface is provided near to the second hole on the chassis. First and second internal threads are provided on the housing, and a first housing bearing surface is provided near to the first internal thread in the housing, and a second housing bearing surface is provided near to the second internal thread in the housing. A first tightening screw is provided for pressure contacting and fixing the first housing bearing surface onto the first chassis bearing surface by passing the first fastening screw through the first hole and screwing into the first internal thread. A second fastening screw is provided for pressure contacting and fixing the second housing bearing surface onto the second chassis bearing surface by passing the second fastening screw through the second hole and screwing into the second internal thread. Also, an adjusting screw engages with the internal thread for tilt adjustment in such a way that its tip contacts the housing.

With the above configuration, the capstan shaft may be secured with a high degree of accuracy on the chassis by means of a simple structure. Consequently, the present invention offers a small and inexpensive magnetic recording and reproducing apparatus with high reliability.

DETAILED DESCRIPTION OF THE PREFERRED EMBODIMENT

First Embodiment

A magnetic recording and reproducing apparatus in accordance with a first embodiment of the present invention is described with reference to FIGS. 1 to 5.

Figure 1:
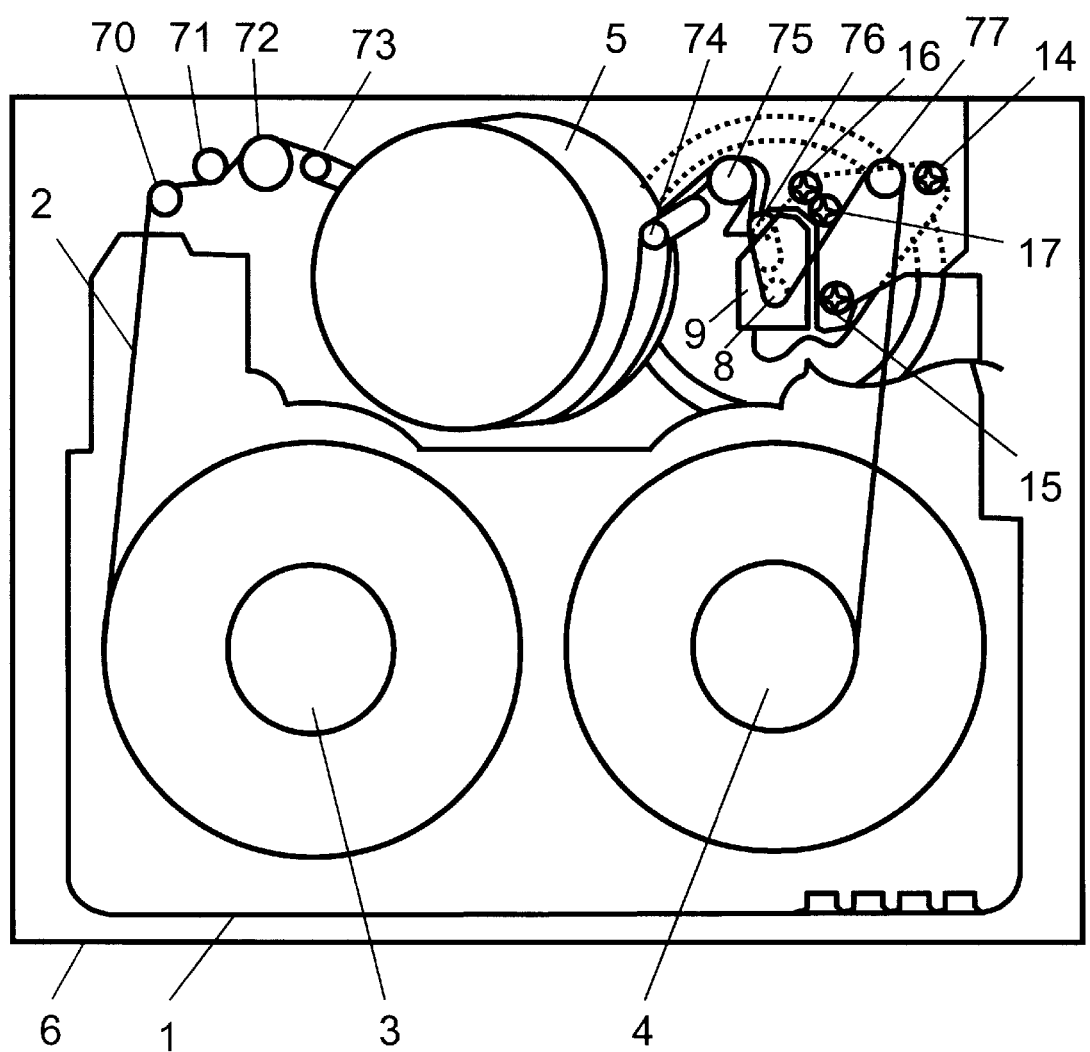
FIG. 1 is a schematic view of a magnetic recording and reproducing apparatus in a position for recording and reproducing signals onto and from a magnetic tape in accordance with a first embodiment of the present invention.

In FIG. 1, reels 3 and 4 are housed in a tape cassette 1. A magnetic tape 2, accommodated in the tape cassette 1, is spooled around the reels 3 and 4. A rotary head cylinder unit 5, to which a magnetic head is attached, records and reproduces signals to and from the magnetic tape 2. The rotary head cylinder unit 5 is mounted on a chassis 6. Tape guide posts 70, 71, 72, 73, 74, 75, 76, and 77 are columns for leading out the magnetic tape 2 from the tape cassette 1, and guiding it to a predetermined position for recording and reproducing signals. The magnetic tape 2 is in pressure contact with the capstan shaft 8 by means of a pinch roller (not illustrated), and the magnetic tape 2 is driven by rotation of the capstan shaft 8. The bearing of the capstan shaft 8 is journaled to a housing 9.

Figure 2:
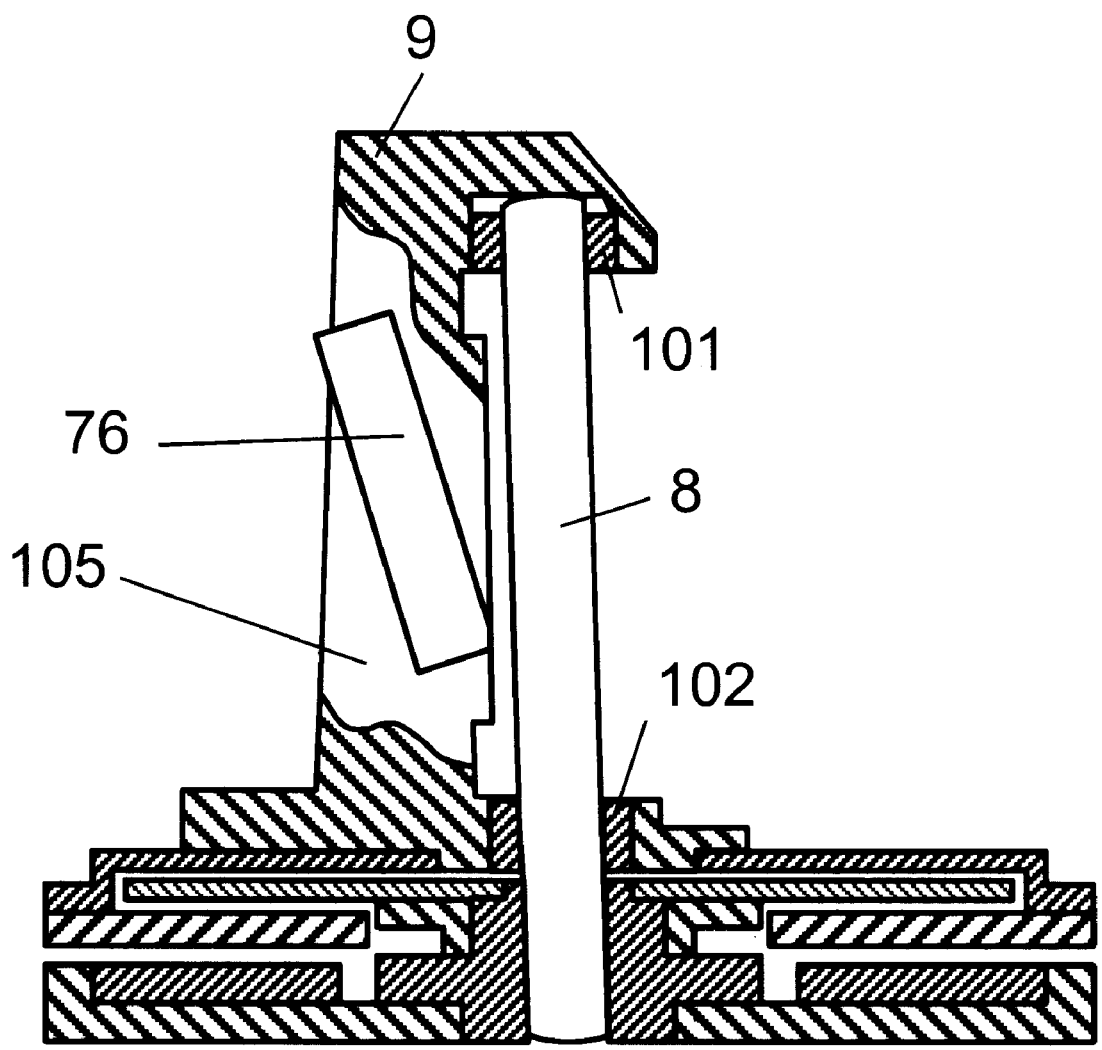
FIG. 2 is a sectional view of a housing of the magnetic recording and reproducing apparatus in accordance with the first embodiment.

Next the housing 9 is described with reference to FIGS. 2 and 3. The housing 9 has bearings 101 and 102 for the capstan shaft 8. The housing 9 also comprises a first internal thread 11, second internal thread 12, third internal thread 13, first housing bearing surface 91 provided near to the first internal thread 11, second housing bearing surface 92 provided near to the second internal thread 12, and third housing bearing surface 93 provided near to the third internal thread 13 for fixing itself onto the chassis 6.

Figure 4:
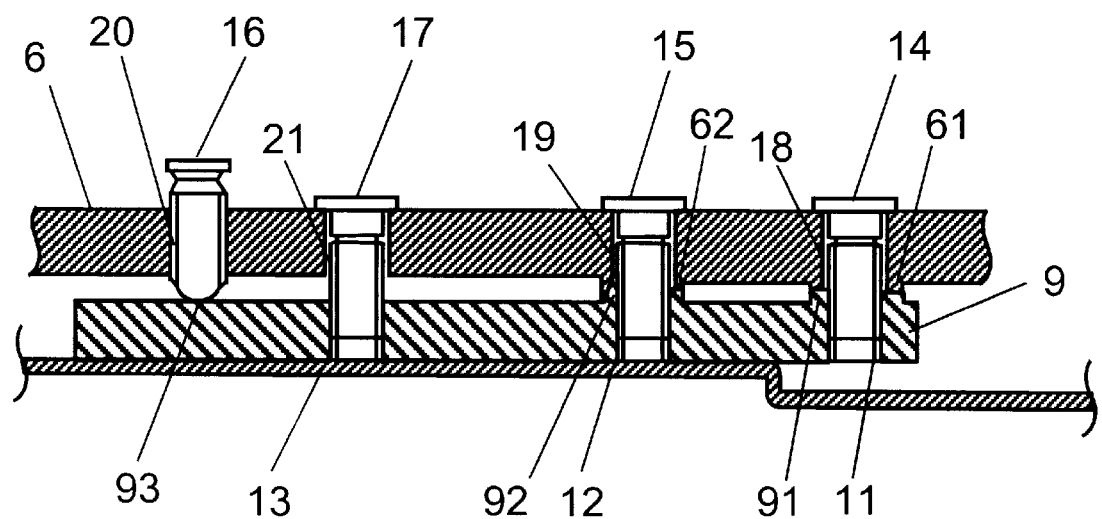
FIG. 4 is a sectional view of a structure of a screw for fixing the housing onto a chassis in FIG. 2.
Figure 5:
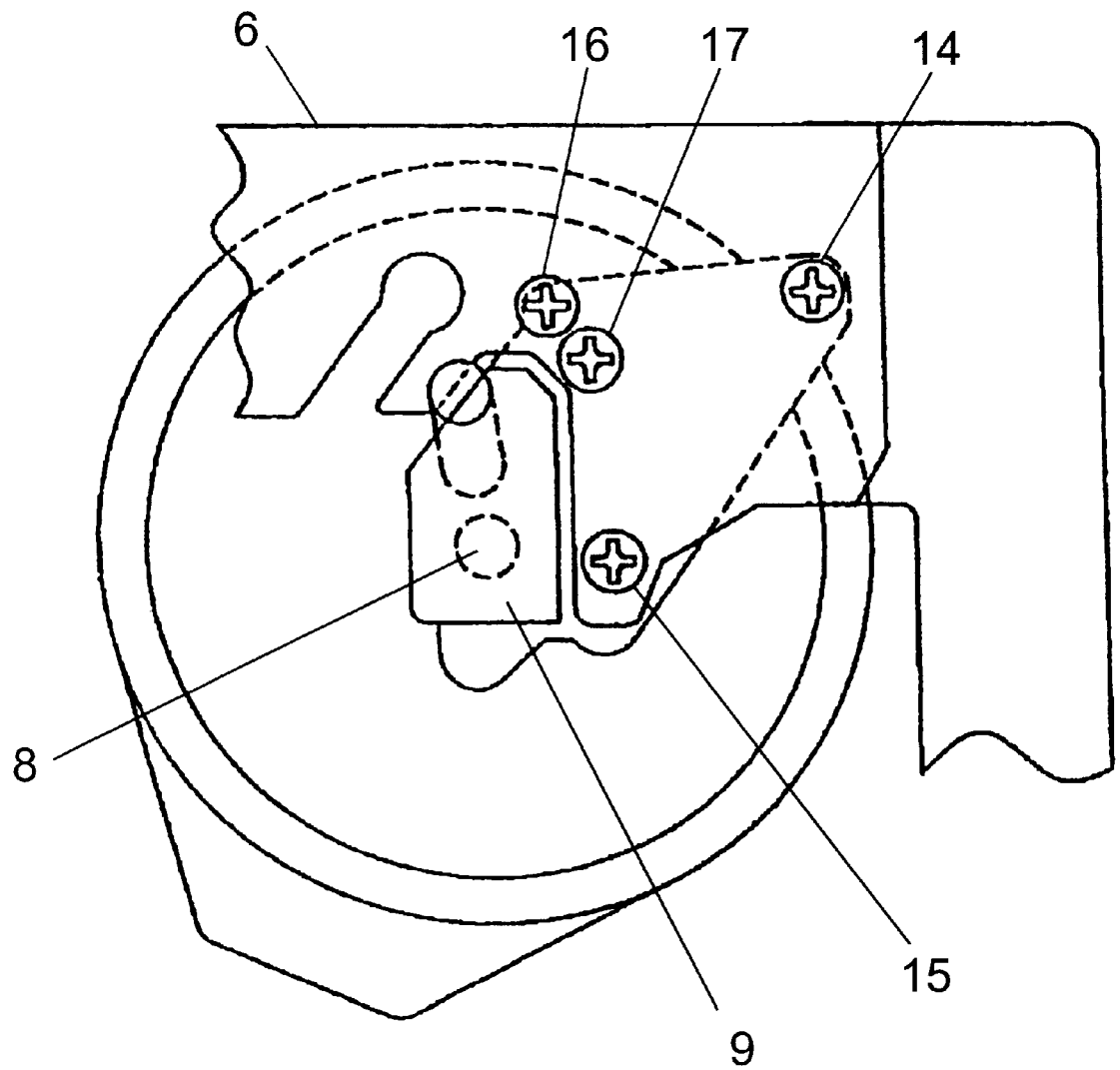
FIG. 5 is a plan view of a structure of a screw for fixing the housing onto the chassis in FIG. 2.

Next, the attachment of the housing 9 onto the chassis 6 is described with reference to FIGS. 4 and 5. FIG. 4 is a sectional view of the structure for fixing the housing 9 onto the chassis 6. To facilitate explanation, in this sectional view, the screws are aligned linearly. FIG. 5 is a plan view of FIG. 4. A first fastening screw 14 passes through a first hole 18 in the chassis 6, and screws into the first internal thread 11 of the housing 9 for pressure contacting and fixing the first housing bearing surface 91 onto a first chassis bearing surface 61 provided adjacent the first hole 18 of the chassis 6. A second fastening screw 15 passes through a second hole 19 of the chassis 6, and screws into the second internal thread 12 of the housing 9 for pressure contacting and fixing the second housing bearing surface 92 onto a second chassis bearing surface 62 provided adjacent the second hole 19 of the chassis 6. An adjusting screw 16 engages with an internal thread for tilt adjustment of the chassis 6 in such a way that its tip contacts the third housing bearing surface 93. A third fastening screw 17 passes through a third hole 21 provided on the chassis 6, and screws into the third internal thread 13 of the housing 9.

Next, how the housing 9 is fixed onto the chassis 6 is described with reference to FIGS. 4 and 5. After tightening the first fastening screw 14, the second fastening screw 15 is tightened.

Then, the degree of rotation of the adjusting screw 16 is varied to optimize the tilt of the capstan shaft 8. The housing 9 is in turn fixed onto the chassis 6 at an angle very close to the optimal tilt. The third fastening screw 17 is then tightened to further firmly secure the housing 9 onto the chassis 6.

As described above, the first embodiment facilitates optimization of the tilt of the capstan shaft 8 by providing a tilt adjusting mechanism for the capstan shaft 8 in the structure for fixing the housing 9 onto the chassis 6, thus realizing stable tape transport.

Second Embodiment

A magnetic recording and reproducing apparatus in accordance with a second embodiment of the present invention is described with reference to FIG. 2 and 3.

Figure 3:
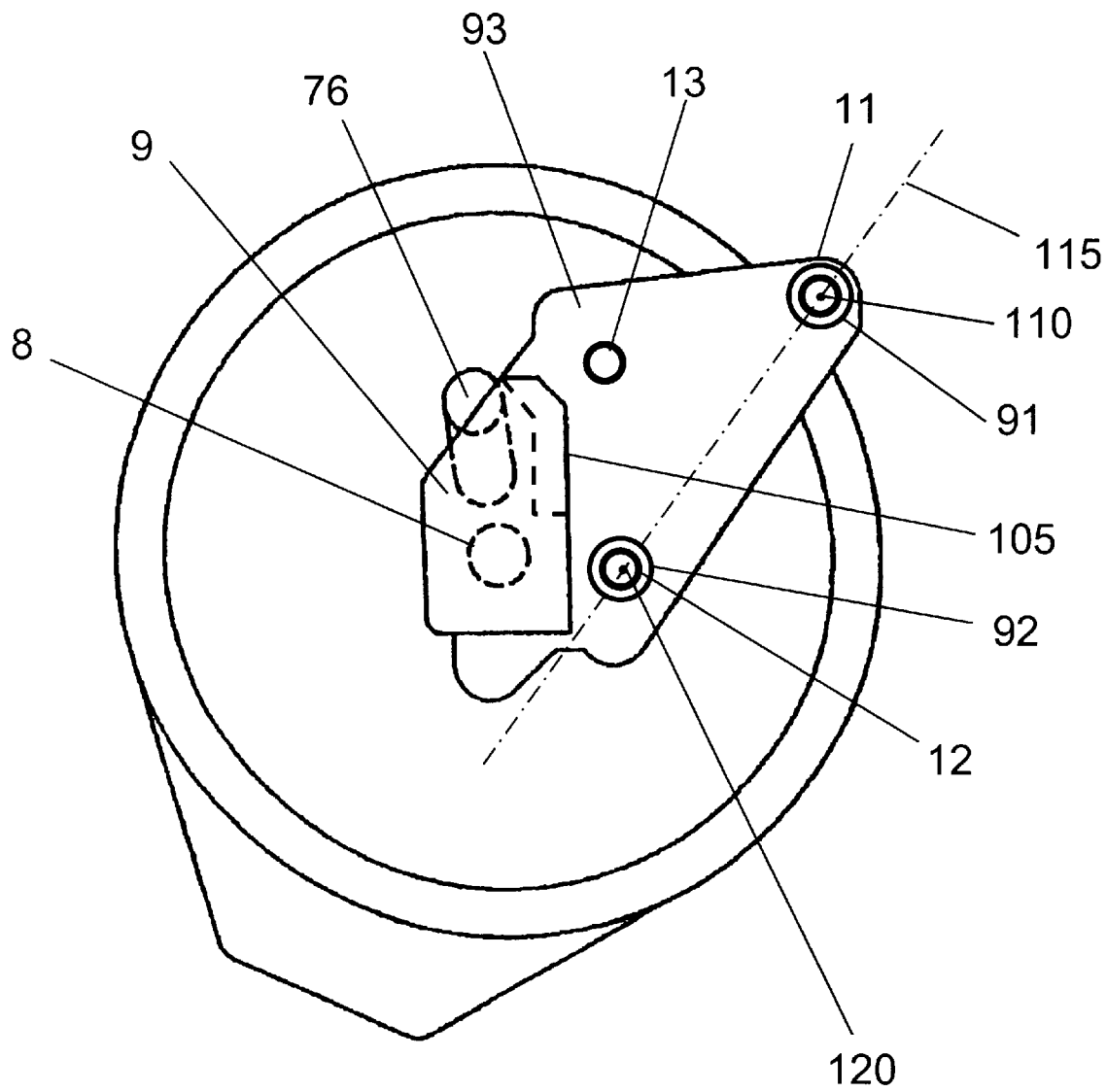
FIG. 3 is a plan view of the housing in FIG. 2.

In FIG. 3, a straight line 115 is a line defined by the center 110 of the first internal thread 11 and the center 120 of the second internal thread 12. Of the two bearings 101 and 102 securing the capstan shaft 8, the upper bearing 101 is supported by a support 105. The third internal thread 13 and the third housing bearing surface 93 are disposed closer to the capstan shaft 8 and support 105 than the straight line 115. This structure further facilitates the adjustment of the tilt of the capstan shaft 8. The method for adjusting the tilt of the capstan shaft 8 after fixing the housing 9 onto the chassis 6 is the same as that described in the first exemplary embodiment.

The configuration of the second embodiment facilitates adjustment of the tilt of the capstan shaft 8. The matching of the centers of the two bearings 101 and 102 enables smoother rotation of the capstan shaft 8. Accordingly, stable tape transport is realized.

Third Embodiment

Figure 6:
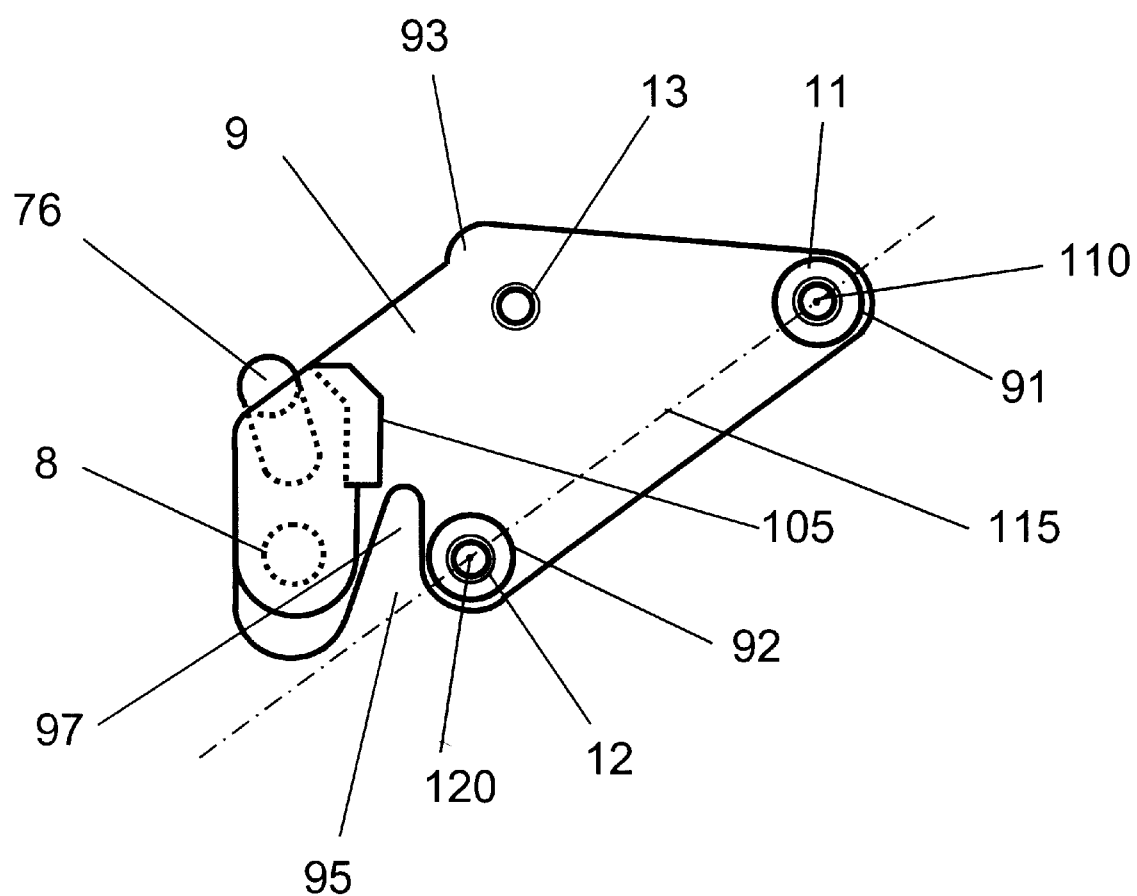
FIG. 6 is a partial plan view of the housing of the magnetic recording and reproducing apparatus in accordance with a third embodiment.

A magnetic recording and reproducing apparatus in a third embodiment is described with reference to FIG. 6.

A notch 97 is disposed between the straight line 115 crossing the center 110 of the first internal thread 11 and the center 120 of the second internal thread 12, and the capstan shaft 8. More specifically, an opening 95 is created between the capstan shaft 8 and the second internal thread 12. In addition, the notch 97 is extended close to the support 105. This structure facilitates adjustment of the tilt of the capstan shaft 8.

The notch 97 is provided at a position closer to the capstan shaft 8 and support 105 than from the straight line 115. As far as space for fixing the housing 9 onto the chassis 6 permits, the capstan shaft 8 and support 105 are preferably disposed as far as possible from the straight line 115. This enables the adjustment of the screwing degree of the adjusting screw 16 by applying a smaller torque for optimizing the tilt of the capstan shaft 8.

Accordingly, the configuration of the third embodiment facilitates adjustment of the tilt of the capstan shaft 8. Matching of the centers of the two bearings 101 and 102 realizes smoother rotation of the capstan shaft 8, thus realizing stable tape transport.

Fourth Embodiment

A magnetic recording and reproducing apparatus in accordance with a fourth embodiment of the present invention is described with reference to FIGS. 7 and 8.

Figure 7:
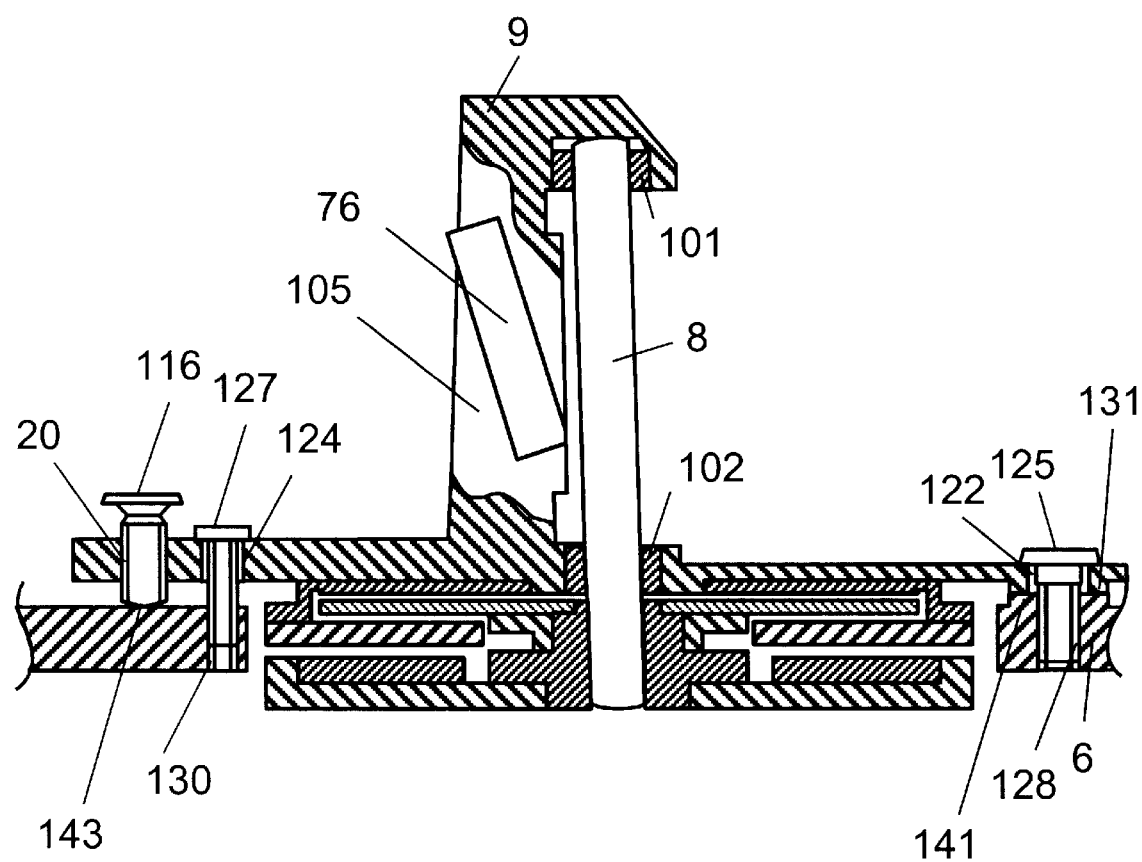
FIG. 7 is a sectional view of a housing of the magnetic recording and reproducing apparatus in accordance with a fourth embodiment.

FIG. 7 is a sectional view of the attachment of the housing 9 onto the chassis 6. FIG. 8 is a plan view of FIG. 7. In FIGS. 7 and 8, the housing 9 has a first hole 122, second hole 123, and third hole 124. A first fastening screw 125 passes through the first hole 122, and screws into a first internal thread 128 of the chassis 6 for pressure contacting and fixing a first housing bearing surface 131 provided adjacent the first hole 122 onto a first chassis bearing surface 141 provided near to the first internal thread 128. A second fastening screw 126 passes through the second hole 123, and screws into a second internal thread 129 for pressure contacting and fixing a second housing bearing surface 132 provided adjacent the second hole 123 onto a second chassis bearing surface 142 provided adjacent the second internal thread 129. An adjusting screw 116 engages with an internal thread for tilt adjustment 120 of the housing 9 in such a way that its tip contacts a third chassis bearing surface 143 of the chassis 6. A third fastening screw 127 passes through the third hole 124 provided on the housing 9, and screws into a third internal thread 130 of the chassis 6. Here, the first hole 122, first fastening screw 125, and first internal thread 128 have the same structure as the second hole 123, second fastening screw 126, and second internal thread 129, respectively. And, therefore only the first attachment point is illustrated in FIG. 7.

Next, how the housing 9 is fixed onto the chassis 6 is described with reference to FIGS. 7 and 8. After tightening the first fastening screw 125, the second fastening screw 126 is tightened. Then, the degree of rotation of the adjusting screw 116 is varied to optimize the tilt of the capstan shaft 8. The housing 9 is in turn fixed onto the chassis at an angle very close to the optimal tilt. The third fastening screw 127 is then tightened to further firmly secure the housing onto the chassis 6.

As described above, the fourth embodiment facilitates optimization of the tilt of the capstan shaft 8 by providing a tilt adjustment mechanism for the capstan shaft 8 in the structure for fixing the housing 9 onto the chassis 6, thus realizing stable tape transport.

Figure 8:
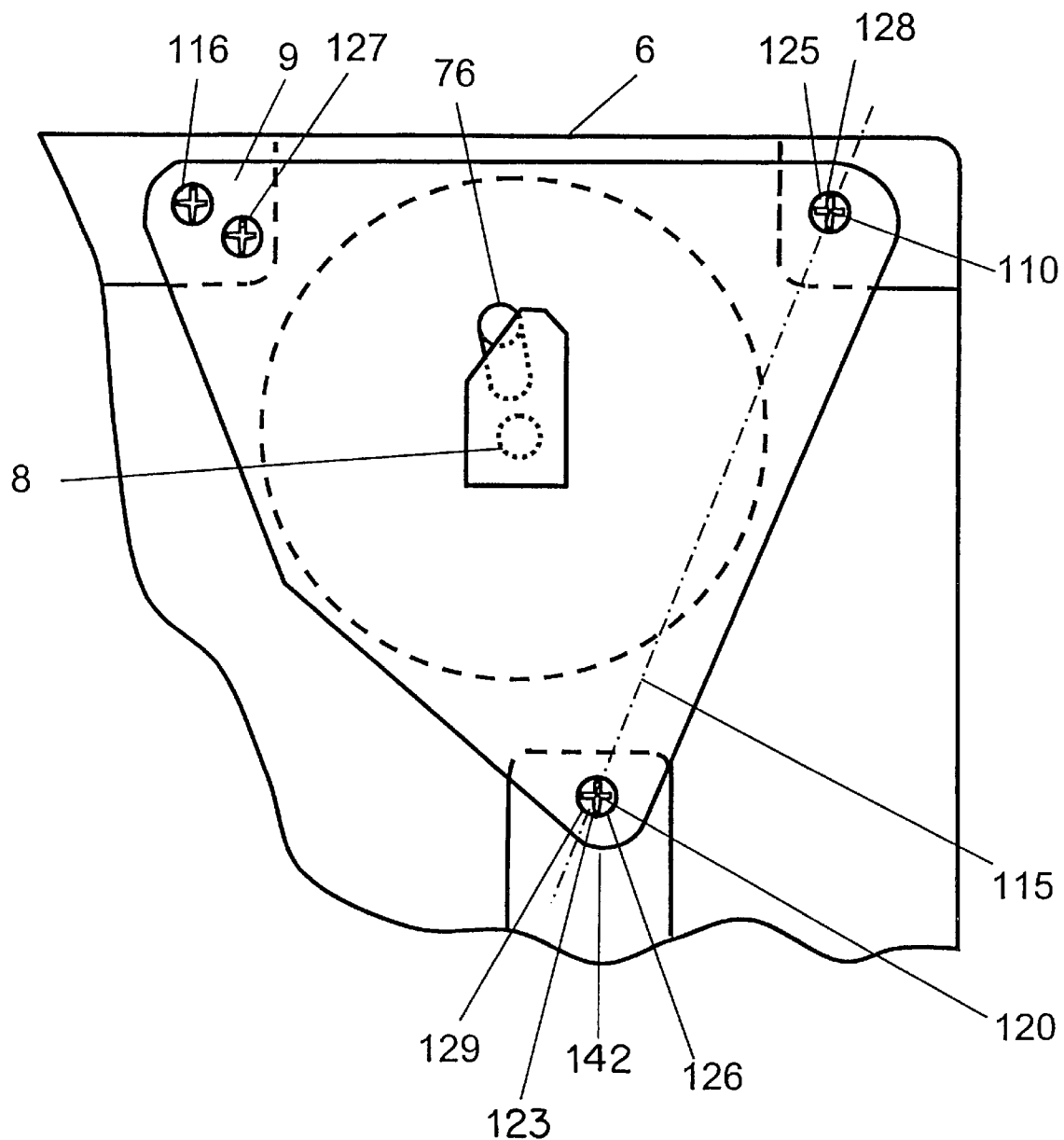
FIG. 8 is a plan view of the housing in FIG. 7.
Figure 9:
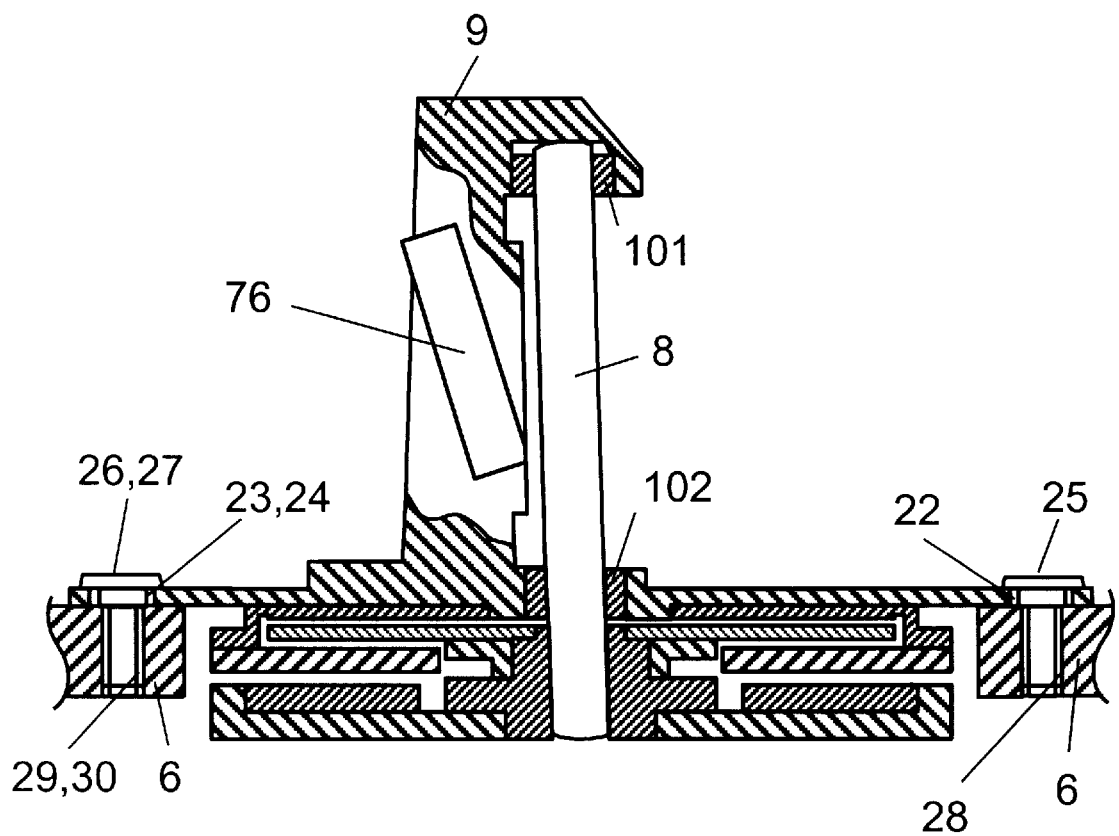
FIG. 9 is a side view of a prior art capstan housing unit of the magnetic recording and reproducing apparatus.

In FIG. 8, the straight line 115 is a line crossing the center 110 of the first internal thread 128 and the center 120 of the second internal thread 129. Of the two bearings 101 and 102 securing the capstan shaft 8, the upper bearing 101 is supported by the support 105. The third internal thread 130 and the third chassis bearing surface 143 are disposed closer to the capstan shaft 8 and support 105 than the straight line 115. This structure further facilitates adjustment of the tilt of the capstan shaft 8.

The configuration of the fourth embodiment facilitates adjustment of the tilt of the capstan shaft 8. The matching of the centers of the two bearings 101 and 102 enables smoother rotation of the capstan shaft 8. Accordingly, stable tape transport is realized.

The magnetic recording and reproducing apparatus of the present invention as described above thus enables the easy and accurate optimization of the tilt of the capstan shaft by adjusting the tilt of the capstan shaft by means of an extremely simple structure. Consequently, stable tape transport is realized, offering a small and inexpensive, but highly reliable magnetic recording and reproducing apparatus.

What is claimed is:

1. A magnetic recording and reproducing apparatus comprising:
    a capstan shaft for driving a magnetic tape;
    a chassis including a first through hole, a second through hole, an internally threaded opening, a first chassis bearing surface disposed adjacent said first through hole, and a second chassis bearing surface disposed adjacent said second through hole;
    a housing having a bearing supporting said capstan shaft, said housing including a first threaded opening, a second threaded opening, a first housing bearing surface provided adjacent said first threaded opening, and a second housing bearing surface provided adjacent said second threaded opening;
    a first threaded fastener passing through said first through hole and engaging in said first threaded opening in order to fix said first chassis bearing surface in contact with said first housing bearing surface;
    a second threaded fastener passing through said second through hole and engaging in said second threaded opening in order to fix said second chassis bearing surface in contact with said second housing bearing surface; and
    an adjusting screw threadedly engaging said internally threaded opening and having a tip portion for contacting a surface of said housing for tilt adjustment of said capstan shaft.

2. The magnetic recording and reproducing apparatus as claimed in claim 1, further comprising:
    a third through hole in said chassis;
    a third threaded opening provided in said housing; and
    a third threaded fastener passing through said third through hole and engaging in said third threaded opening.

3. The magnetic recording and reproducing apparatus as claimed in claim 2, wherein said third through hole and said third threaded opening are disposed closer to said internally threaded opening in said chassis than to a line defined by a center of said first through hole and a center of said second through hole.

4. The magnetic recording and reproducing apparatus as claimed in claim 2, wherein said internally threaded opening in said chassis is disposed closer to said capstan shaft than to a line defined by a center of said first through hole and a center of said second through hole.

5. The magnetic recording and reproducing apparatus as claimed in claim 2, wherein said housing is provided with a notch which is located closer to said internally threaded opening in said chassis than to a line defined by a center of said first through hole and a center of said second through hole.

6. The magnetic recording and reproducing apparatus as claimed in claim 1, wherein said internally threaded opening in said chassis is disposed closer to said capstan shaft than to a line defined by a center of said first through hole and a center of said second through hole.

7. The magnetic recording and reproducing apparatus as claimed in claim 6, wherein said housing is provided with a notch which is located closer to said internally threaded opening in said chassis than to a line defined by a center of said first through hole and a center of said second through hole.

8. The magnetic recording and reproducing apparatus as claimed in claim 1, wherein said housing is provided with a notch which is located closer to said internally threaded opening in said chassis than to a line defined by a center of said first through hole and a center of said second through hole.

9. A magnetic recording and reproducing apparatus comprising:
    a capstan shaft for driving a magnetic tape;
    a chassis including a first through hole, a second through hole, an internally threaded opening, a first chassis bearing surface disposed adjacent said first through hole, and a second chassis bearing surface disposed adjacent said second through hole;
    a housing having a bearing supporting said capstan shaft, said housing including a first threaded opening, a second threaded opening, a first housing bearing surface provided adjacent said first threaded opening, and a second housing bearing surface provided adjacent said second threaded opening;
    a first threaded fastener passing through said first through hole and engaging in said first threaded opening in order to fix said first chassis bearing surface in contact with said first housing bearing surface;
    a second threaded fastener passing through said second through hole and engaging in said second threaded opening in order to fix said second chassis bearing surface in contact with said second housing bearing surface; and
    an adjusting screw threadedly engaging said internally threaded opening and having a tip portion for contacting a surface of said housing for tilt adjustment of said capstan shaft,
    wherein said housing is fixed to said chassis in the following sequence:
        1) said first and second threaded fasteners are tightened; and
        2) the tilt of said capstan shaft is adjusted by rotating said adjusting screw.

10. The magnetic recording and reproducing apparatus as claimed in claim 9, further comprising:

a third through hole in said chassis;

a third threaded opening provided in said housing; and a third threaded fastener passing through said third through hole and engaging in said third threaded opening, wherein said third threaded fastener is tightened after the tilt of said capstan shaft is adjusted.

11. A magnetic recording and reproducing apparatus comprising:

a capstan shaft for driving a magnetic tape;

a chassis including a first threaded opening, a second threaded opening, a first chassis bearing surface disposed adjacent said first threaded opening, and a second chassis bearing surface disposed adjacent said second threaded opening;

a housing having a bearing supporting said capstan shaft, said housing including an internally threaded opening, a first through hole, a second through hole, a first housing bearing surface provided adjacent said first through hole opening, and a second housing bearing surface provided adjacent said second through hole;

a first threaded fastener passing through said first through hole and engaging in said first threaded opening in order to fix said first chassis bearing surface in contact with said first housing bearing surface;

a second threaded fastener passing through said second through hole and engaging in said second threaded opening in order to fix said second chassis bearing surface in contact with said second housing bearing surface; and an adjusting screw threadedly engaging said internally threaded opening in said housing, said adjusting screw having a tip portion for contacting a surface of said chassis for tilt adjustment of said capstan shaft.

12. The magnetic recording and reproducing apparatus as claimed in claim 11, further comprising:

a third through hole in said housing;

a third threaded opening provided in said chassis; and a third threaded fastener passing through said third through hole and engaging in said third threaded opening.

13. The magnetic recording and reproducing apparatus as claimed in claim 12, wherein said third through hole and said third threaded opening are disposed closer to said internally threaded opening in said housing than to a line defined by a center of said first through hole and a center of said second through hole.

14. The magnetic recording and reproducing apparatus as claimed in claim 12, wherein said internally threaded opening in said housing is disposed closer to said capstan shaft than to a line defined by a center of said first through hole and a center of said second through hole.

15. The magnetic recording and reproducing apparatus as claimed in claim 11, wherein said internally threaded opening in said housing is disposed closer to said capstan shaft than to a line defined by a center of said first through hole and a center of said second through hole.

16. A magnetic recording and reproducing apparatus comprising:

a capstan shaft for driving a magnetic tape;

a chassis including a first threaded opening, a second threaded opening, a first chassis bearing surface disposed adjacent said first threaded opening, and a second chassis bearing surface disposed adjacent said second threaded opening;

a housing having a bearing supporting said capstan shaft, said housing including an internally threaded opening, a first through hole, a second through hole, a first housing bearing surface provided adjacent said first through hole opening, and a second housing bearing surface provided adjacent said second through hole;

a first threaded fastener passing through said first through hole and engaging in said first threaded opening in order to fix said first chassis bearing surface in contact with said first housing bearing surface;

a second threaded fastener passing through said second through hole and engaging in said second threaded opening in order to fix said second chassis bearing surface in contact with said second housing bearing surface; and an adjusting screw threadedly engaging said internally threaded opening in said housing, said adjusting screw having a tip portion for contacting a surface of said chassis for tilt adjustment of said capstan shaft, wherein said housing is fixed to said chassis in the following sequence:

1) said first and second threaded fasteners are tightened; and 2) the tilt of said capstan shaft is adjusted by rotating said adjusting screw.

17. The magnetic recording and reproducing apparatus as claimed in claim 16, further comprising:

a third through hole in said housing;

a third threaded opening provided in said chassis; and a third threaded fastener passing through said third through hole and engaging in said third threaded opening, wherein said third threaded fastener is tightened after the tilt of said capstan shaft is adjusted.

18. A method of adjusting the tilt of a capstan shaft in a magnetic recording and reproducing apparatus which comprises:

a capstan shaft for driving a magnetic tape;

a chassis including a first through hole, a second through hole, an internally threaded opening, a first chassis bearing surface disposed adjacent said first through hole, and a second chassis bearing surface disposed adjacent said second through hole;

a housing having a bearing supporting said capstan shaft, said housing including a first threaded opening, a second threaded opening, a first housing bearing surface provided adjacent said first threaded opening, and a second housing bearing surface provided adjacent said second threaded opening;

a first threaded fastener passing through said first through hole and engaging in said first threaded opening in order to fix said first chassis bearing surface in contact with said first housing bearing surface;

a second threaded fastener passing through said second through hole and engaging in said second threaded opening in order to fix said second chassis bearing surface in contact with said second housing bearing surface; and an adjusting screw threadedly engaging said internally threaded opening and having a tip portion for contacting a surface of said housing for tilt adjustment of said capstan shaft, said method comprising:

tightening said first threaded fastener;

tightening said second threaded fastener such that said housing is fixed onto said chassis by said first and second fasteners; and rotating said adjusting screw in order to optimize the tilt of said capstan shaft.

19. The method as claimed in claim 18, further comprising:

tightening a third threaded fastener which passes through a third through hole in said chassis and engages in a third threaded opening in said housing, wherein said third threaded fastener is tightened after adjusting the tilt of said capstan shaft.

20. A method of adjusting the tilt of a capstan shaft in a magnetic recording and reproducing apparatus which comprises:

a capstan shaft for driving a magnetic tape;

a chassis including a first threaded opening, a second threaded opening, a first chassis bearing surface disposed adjacent said first threaded opening, and a second chassis bearing surface disposed adjacent said second threaded opening;

a housing having a bearing supporting said capstan shaft, said housing including an internally threaded opening, a first through hole, a second through hole, a first housing bearing surface provided adjacent said first through hole opening, and a second housing bearing surface provided adjacent said second through hole;

a first threaded fastener passing through said first through hole and engaging in said first threaded opening in order to fix said first chassis bearing surface in contact with said first housing bearing surface;

a second threaded fastener passing through said second through hole and engaging in said second threaded opening in order to fix said second chassis bearing surface in contact with said second housing bearing surface; and an adjusting screw threadedly engaging said internally threaded opening in said housing, said adjusting screw having a tip portion for contacting a surface of said chassis for tilt adjustment of said capstan shaft, said method comprising:

tightening said first threaded fastener;

tightening said second threaded fastener such that said housing is fixed onto said chassis by said first and second fasteners; and rotating said adjusting screw in order to optimize the tilt of said capstan shaft.

21. The method as claimed in claim 20, further comprising:

tightening a third threaded fastener which passes through a third through hole in said housing and engages in a third threaded opening in said chassis, wherein said third threaded fastener is tightened after adjusting the tilt of said capstan shaft.

\* \* \* \* \*